Aug. 31, 1937.                B. LONDON                    2,091,511
                GUM MASSAGING AND TEETH EXERCISING DEVICE
                         Filed Feb. 5, 1937
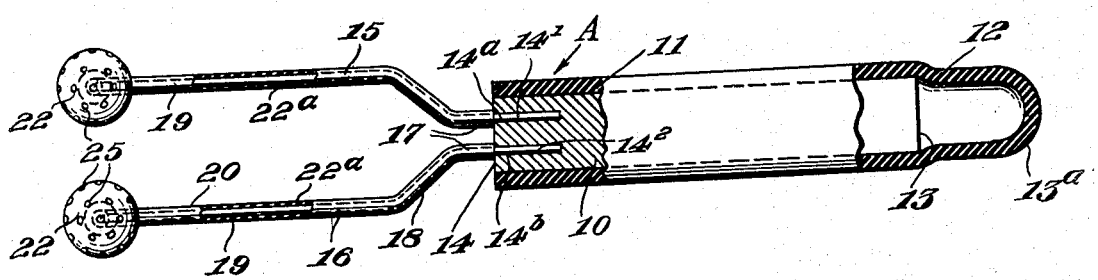
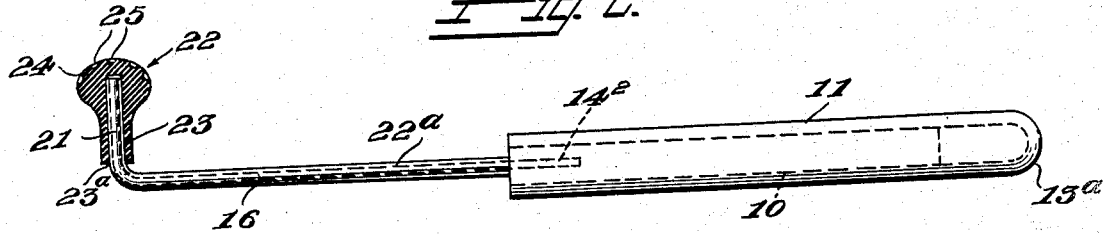
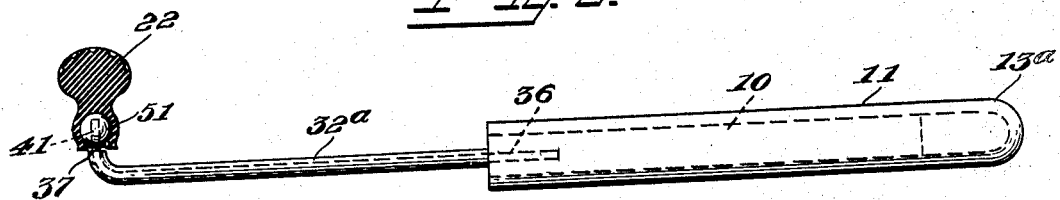
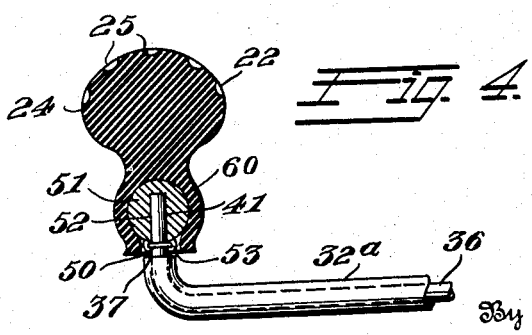
Inventor
Bessie London
By Miller & Miller
Attorneys Patented Aug. 31, 1937

2,091,511

UNITED STATES PATENT OFFICE 2,091,511

GUM MASSAGING AND TEETH EXERCISING DEVICE

Bessie London, Baltimore, Md.

Application February 5, 1937, Serial No. 124,294

2 Claims. (Cl. 128—57)

The present invention relates to a gum massaging and teeth exercising device and more particularly to a device embodying a massager for the gums having means associated therewith, whereby the teeth may be exercised and strengthened by providing a bite therefor combined with means for exerting a pulling action thereon.

One of the primary purposes of the invention is to construct an appliance of the character indicated having a pair of flexible metallic arms or the like, one end of each of the arms being provided with rubber massaging tips and the other end of each of the arms being securely held in a handle of wood, bone or the like.

Still a further aim is the construction of a device of the type specified in which the aforementioned handle is covered by a rubber envelope, a portion of which extends beyond the end of the handle opposite that which receives the flexible arms, said projecting end being adapted to be grasped by the teeth to strengthen the same by manually exerting a pulling action on the handle away from the teeth.

Still another purpose is to make an appliance incorporating the features above outlined, yet which will be of simple construction and well adapted to perform its intended functions; and which may additionally be manufactured at a relatively small cost.

Other aims and objects will be apparent from the detailed description hereinafter appearing when taken in conjunction with the appended drawing forming a part hereof to which reference is now made and in which Fig. 1 is a plan view of the novel gum massager and teeth exerciser with parts broken away and with parts in section to more clearly show structural details.

Fig. 2 is a side elevational view with one of the gum massaging rubber tips shown in section.

Fig. 3 is a view similar to Fig. 2 but showing a modified manner of mounting the rubber massaging tip on its spring supporting arm, the tip being in section.

Fig. 4 is an enlarged detailed view of the massage tip structure of Fig. 3.

Referring for the moment to Figs. 1 and 2, the novel gum massager and teeth exerciser is designated generally as A and is characterized by a handle 10 of rectangular shape, said handle being made of wood, bone or the like. It will be understood that the handle may take any convenient shape or form although a rectangular handle such as shown has been found highly convenient in use. The handle 10 is encased in a rubber sack 11 which covers the top, bottom and side faces of the handle, said sack projecting at one end thereof as at 12 beyond the end face 13 of the handle 10. The closed projecting portion of the sack is designated as 13$^a$. With the structure just described, it will be understood that the teeth of an individual may be exercised in a dual manner. The handle may be inserted in the mouth between the teeth to constitute a bite, so that by repeatedly opening and closing the mouth the teeth may be made to bite into the rubber sack 11 encasing the handle to thus exercise same. Furthermore, the closed projecting portion 13$^a$ of the sack 11 may be grasped between the teeth of the user and chewed and a manual pull away from the teeth may also be exerted by grasping the handle 10 to thus strengthen the teeth.

The opposite end 14 of the handle 10 has secured therein as at 14$^a$, 14$^b$ the ends 14$^1$, 14$^2$ of a pair of similar spring arms 15 and 16. Each arm 15 or 16 projects forwardly a short distance beyond the end of the handle 10 as at 17, then forwardly and outwardly at 18 and then forwardly as at 19 forming a long arm section 20. The arm section 20 is in a plane parallel to the plane of the arm end 14$^2$. Projecting at right angles to the arm sector 20 and at right angles to the longitudinal axis of the handle 10 is a short terminal arm portion 21 constituting a support for the rubber massaging tip 22 in a manner to be shortly described. It will be understood that the structure of each arm 15 and 16 is identical.

A long projecting rubber tubing 22$^a$ encases the exposed portions of each of the spring arms 15 and 16 including the short terminal arm portion 21. Each massager tip 22 is made of rubber and is characterized by a shank portion 23 having a longitudinal slot 23$^a$ terminating short of a head 24 of mushroom shape, the upper, outer surface of mushroom-shaped head being provided with a series of small, spaced apertures or indentations 25 adapted to receive gum massage paste or powder or the like. The diameter of the longitudinal shank slot 23$^a$ is slightly less than the diameter of the terminal arm portion 21 and its rubber tubing 22$^a$, whereby the massage tip 22 will be frictionally held in place on said terminal arm portion 21 by inserting the latter within said slot 23$^a$.

In use of the gum massager a quantity of gum massaging cream or powder is placed on each mushroom head or tip 24 and its indentations 25 and the handle is grasped and pressure exerted on the gums while the tips 24 are moved over the surface thereof. Due to the fact that the arms 15 and 16 are of spring metal both the normally exposed and the inner unexposed surfaces of the gums may be simultaneously massaged, the arms being grasped in the hand of the user and flexed to bring the tips into frictional contact with the gums. It will be seen that the gums may be efficiently massaged to increase the circulation of the blood therein and thus promote the health thereof.

In Figs. 3 and 4 there is illustrated a modified manner of mounting the rubber massaging tips 22 whereby the latter may be rotatably mounted on the terminal arm portion 41 of the arm 36. The rubber tubing 32ª terminates at 37 above which point the arm portion 41 is provided with an integral annular rib 50. A metallic ball 51 has an internal aperture 52 into which the terminal arm portion 41 loosely fits; said ball having spaced metallic spring fingers 53 which are adapted to snap over and loosely engage the annular rib 50. The rubber tip 22 is provided with a socket 60 adapted to frictionally and firmly receive and engage the ball 51. From the above it will be evident that by means of the structure of Figs. 3 and 4 there will result in the use of the device a rotary massaging action on the gums.

Various other changes and modifications may be made to embody the spirit and purpose of the invention and it is contemplated to cover such variations and to be limited in this respect only as may be necessary by the scope of the appended claims.

Having thus set forth the invention what I claim as new and desire to secure by Letters Patent is:

1. As a new article of manufacture, a handle, a rubber sack enclosing said handle and projecting beyond one end thereof, said projecting end constituting a chew and pull tooth exerciser the opposite end of said handle having a pair of resilient arms secured thereto, said arms being provided with gum massaging rubber tips.

2. As a new article of manufacture, a handle, a pair of resilient arms each having an end secured to one end of the handle, the opposite end of each arm terminating in an arm portion disposed at right angles to said arm and to the longitudinal axis of the handle, a ball having an internal aperture and spring fingers, a rib on each arm portion, said arm portion loosely received within said internal aperture with the spring fingers loosely snapped over said rib, and a rubber tip having a socket frictionally receiving said ball.

BESSIE LONDON.